United States Patent
Son et al.

(10) Patent No.: US 12,037,281 B2
(45) Date of Patent: Jul. 16, 2024

(54) METHOD OF MANUFACTURING HETEROGENEOUS MATERIAL JOINED BODY

(71) Applicant: LG CHEM, LTD., Seoul (KR)

(72) Inventors: Bu Won Son, Daejeon (KR); Jin Soo Lee, Daejeon (KR); Jin Mi Jung, Daejeon (KR); Bu Gon Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1190 days.

(21) Appl. No.: 16/639,481

(22) PCT Filed: Oct. 12, 2018

(86) PCT No.: PCT/KR2018/012050
§ 371 (c)(1),
(2) Date: Feb. 14, 2020

(87) PCT Pub. No.: WO2019/074327
PCT Pub. Date: Apr. 18, 2019

(65) Prior Publication Data
US 2021/0130227 A1 May 6, 2021

(30) Foreign Application Priority Data
Oct. 12, 2017 (KR) .................. 10-2017-0132736

(51) Int. Cl.
*C03C 15/00* (2006.01)
*B23K 26/00* (2014.01)
(Continued)

(52) U.S. Cl.
CPC .......... *C03C 15/00* (2013.01); *B23K 26/0006* (2013.01); *B23K 26/0624* (2015.10);
(Continued)

(58) Field of Classification Search
None
See application file for complete search history.

(56) References Cited

U.S. PATENT DOCUMENTS

2009/0252978 A1* 10/2009 Katayama ......... B29C 66/91411
156/272.8
2010/0047587 A1* 2/2010 Itoh ..................... B29C 66/43
428/411.1

FOREIGN PATENT DOCUMENTS

CN 110498612 A * 11/2019
EP 1920906 A1 5/2008
(Continued)

OTHER PUBLICATIONS

JP2009226643A EPO Machine Translation—Performed Sep. 1, 2023. (Year: 2023).*

(Continued)

*Primary Examiner* — Lisa L Herring
(74) *Attorney, Agent, or Firm* — Bryan Cave Leighton Paisner LLP

(57) ABSTRACT

Provided is a method of manufacturing a heterogeneous material joined body, the method comprising irradiating a surface of a glass layer with a first laser to form two or more etched lines on the surface of the glass layer; providing a resin layer on the surface of the glass layer having the two or more etched lines; and irradiating the surface of the glass layer with the resin layer with a second laser to fill the etched lines and the surface of the glass layer with the resin layer and join the resin layer and the glass layer, wherein the glass layer having the two or more etched lines is irradiated with the second laser in a direction from the glass layer to the resin layer with focus on the surface of the glass layer which is in contact with the resin layer.

15 Claims, 10 Drawing Sheets

(51) Int. Cl.
    *B23K 26/0622*     (2014.01)
    *B23K 26/364*     (2014.01)
    *B23K 26/402*     (2014.01)
    *B23K 26/57*     (2014.01)
    *B29C 65/00*     (2006.01)
    *B32B 3/30*     (2006.01)
    *B32B 17/10*     (2006.01)
    *C03B 33/07*     (2006.01)
    *C03B 33/09*     (2006.01)
    *C03C 27/06*     (2006.01)

(52) U.S. Cl.
    CPC .......... *B23K 26/364* (2015.10); *B23K 26/402* (2013.01); *B23K 26/57* (2015.10); *B29C 66/30325* (2013.01); *B32B 3/30* (2013.01); *B32B 17/10036* (2013.01); *B32B 17/10146* (2013.01); *B32B 17/1055* (2013.01); *C03B 33/07* (2013.01); *C03B 33/091* (2013.01); *C03C 27/06* (2013.01); *B32B 2250/03* (2013.01); *B32B 2250/40* (2013.01)

(56) References Cited

FOREIGN PATENT DOCUMENTS

| | | | | |
|---|---|---|---|---|
| JP | 62-064528 A | 3/1987 | | |
| JP | 2006-015405 A | 1/2006 | | |
| JP | 2008-162288 A | 7/2008 | | |
| JP | 2008-189764 A | 8/2008 | | |
| JP | 2009208374 A | * | 9/2009 | ......... B29C 65/1629 |
| JP | 2009-226643 A | 10/2009 | | |
| JP | 2011-37707 A | 2/2011 | | |
| JP | 2014-018995 A | 2/2014 | | |
| JP | 2015506838 A | 3/2015 | | |
| JP | 2016-141052 A | 8/2016 | | |
| JP | 2016144823 A | * | 8/2016 | ......... B23K 26/0622 |
| KR | 100883079 B1 | 2/2009 | | |
| KR | 10-2009-0073167 A | 7/2009 | | |
| KR | 1020090098635 A | 9/2009 | | |
| KR | 10-2013-0060139 A | 6/2013 | | |
| KR | 10-1645401 B1 | 8/2016 | | |
| WO | 2007/029440 A1 | 3/2007 | | |

OTHER PUBLICATIONS

JP2016144823 Clarivate Analytics Machine Translation—Performed Sep. 1, 2023. (Year: 2023).*
JP-2009208374-A EPO Machine Translation—Performed Sep. 1, 2023. (Year: 2023).*
CN 110498612 A Clarivate Analytics Machine Translation—Performed Sep. 5, 2023. (Year: 2023).*
Nieto et al., "Single-pulse laser ablation threshold of borosilicate, fused silica, sapphire, and soda-lime glass for pulse widths of 500 fs, 10 ps, 20 ns", Applied Optics Vo. 54 No. 29, Oct. 2015, pp. 8596-8601. (Year: 2015).*

* cited by examiner

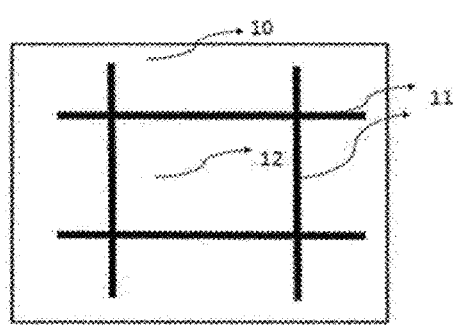 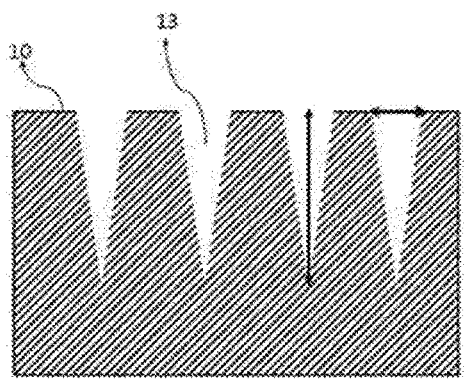
FIG. 2A
FIG. 2B

[Figure 3]
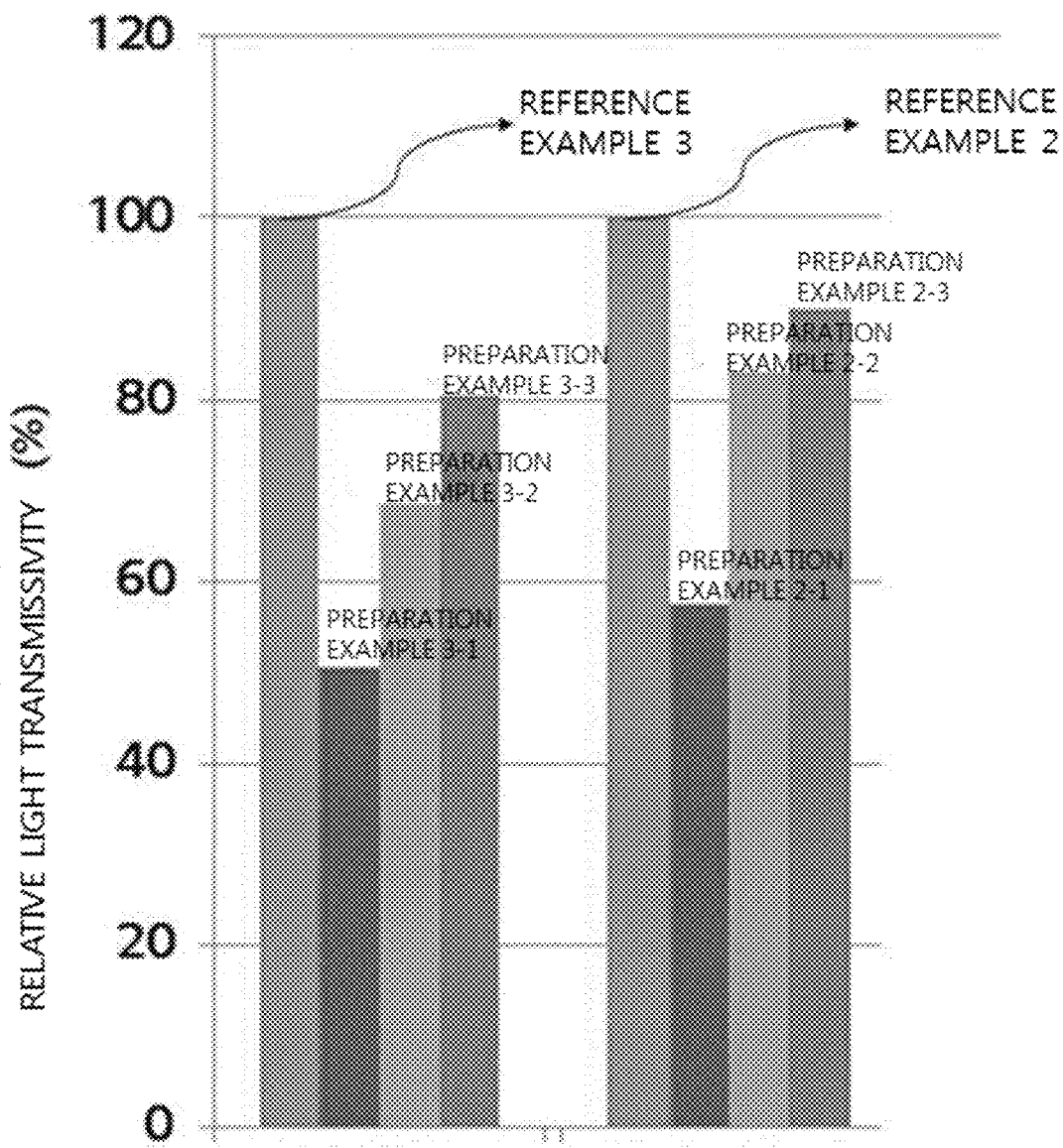

[Figure 4]
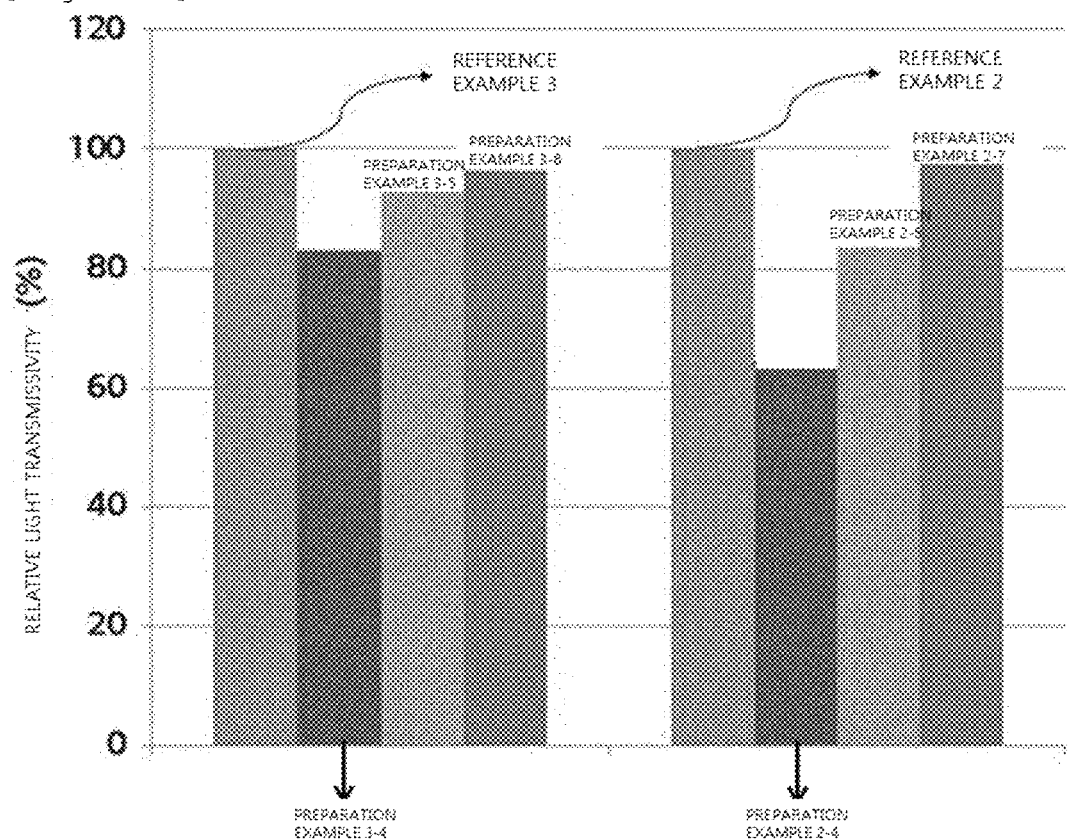

[Figure 5]
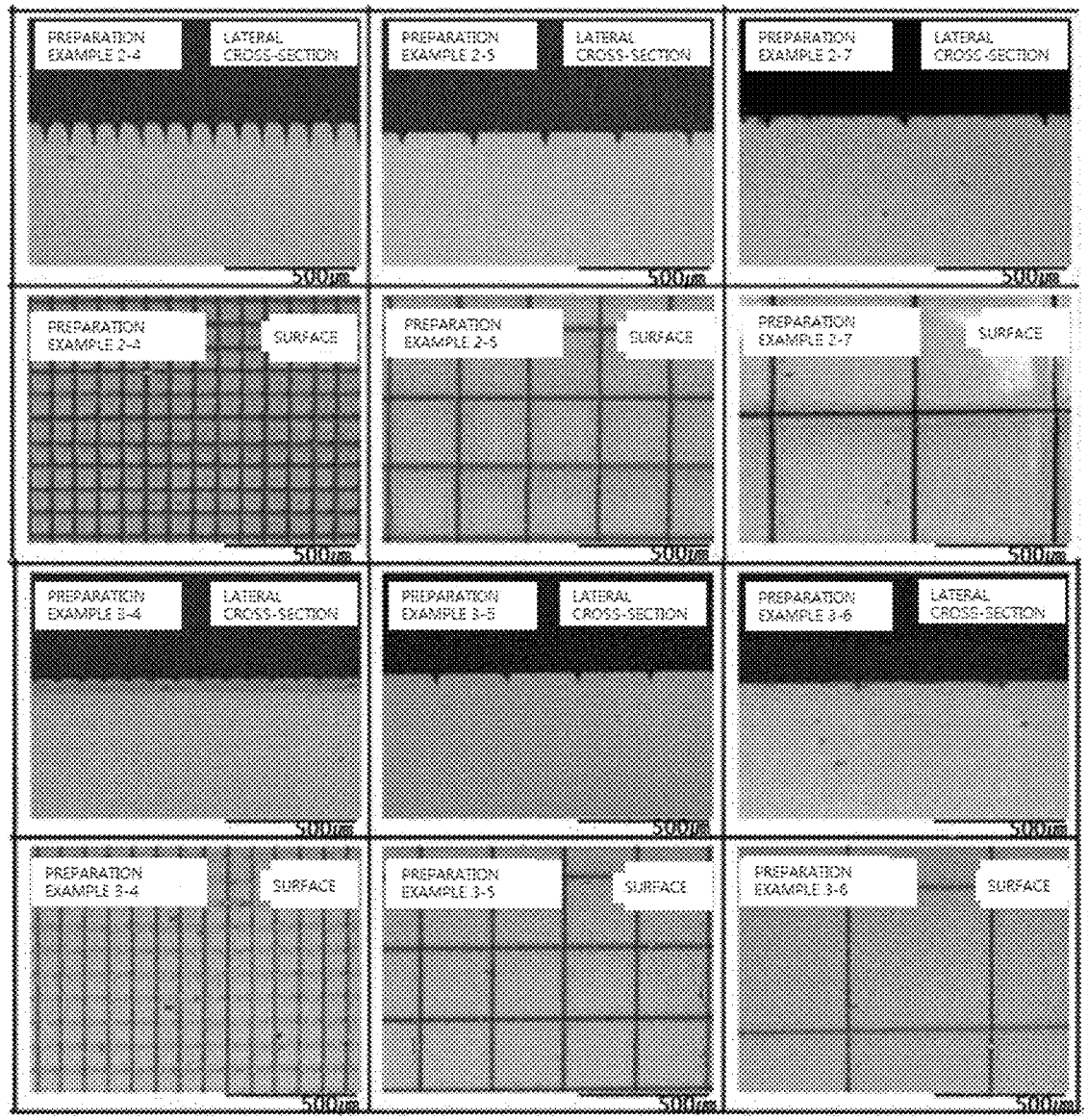

[Figure 6]
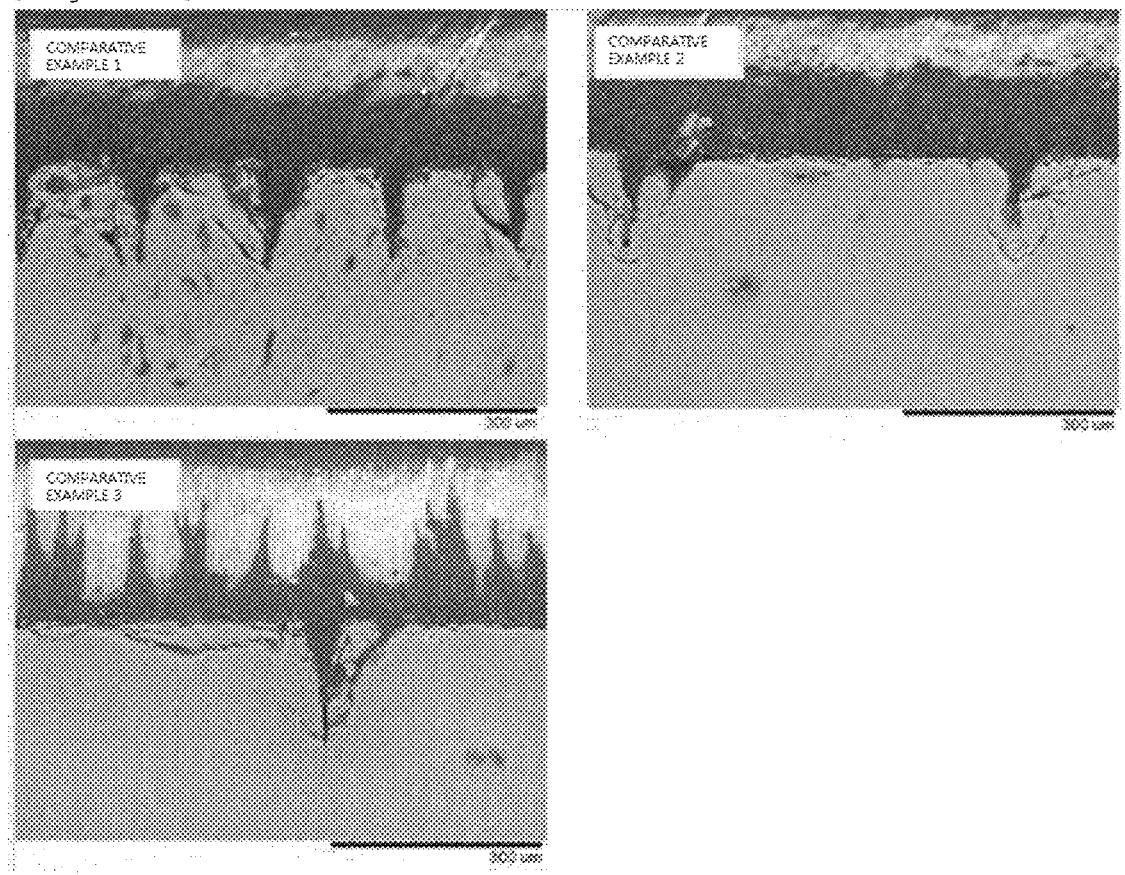

[Figure 7]
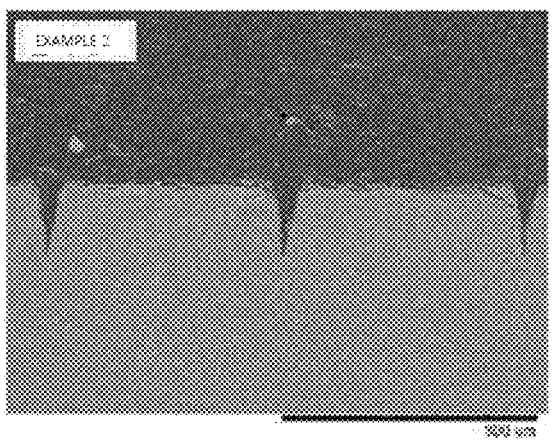 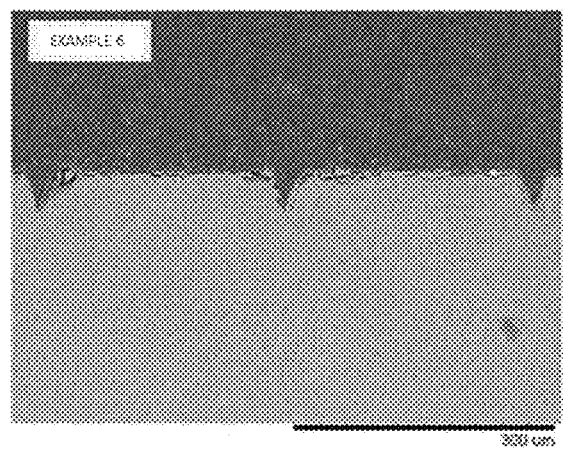

[Figure 8]
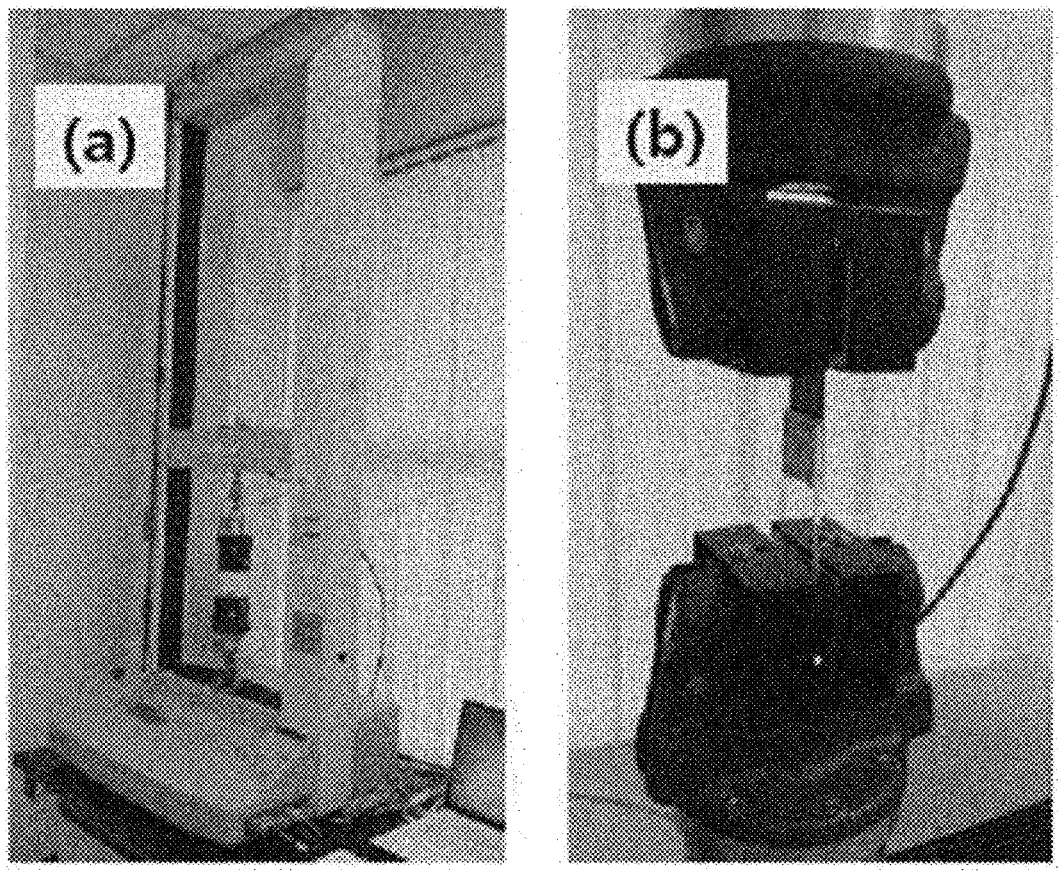
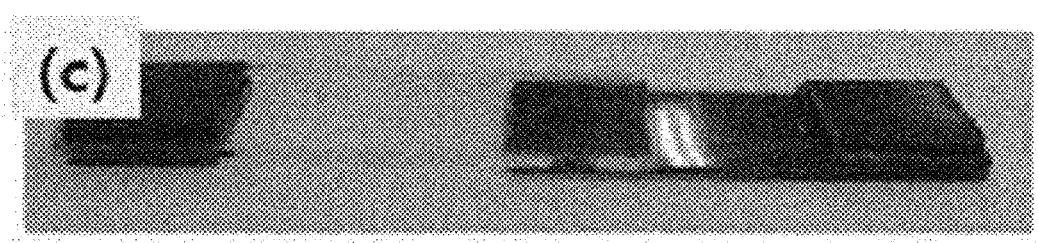

[Figure 9]
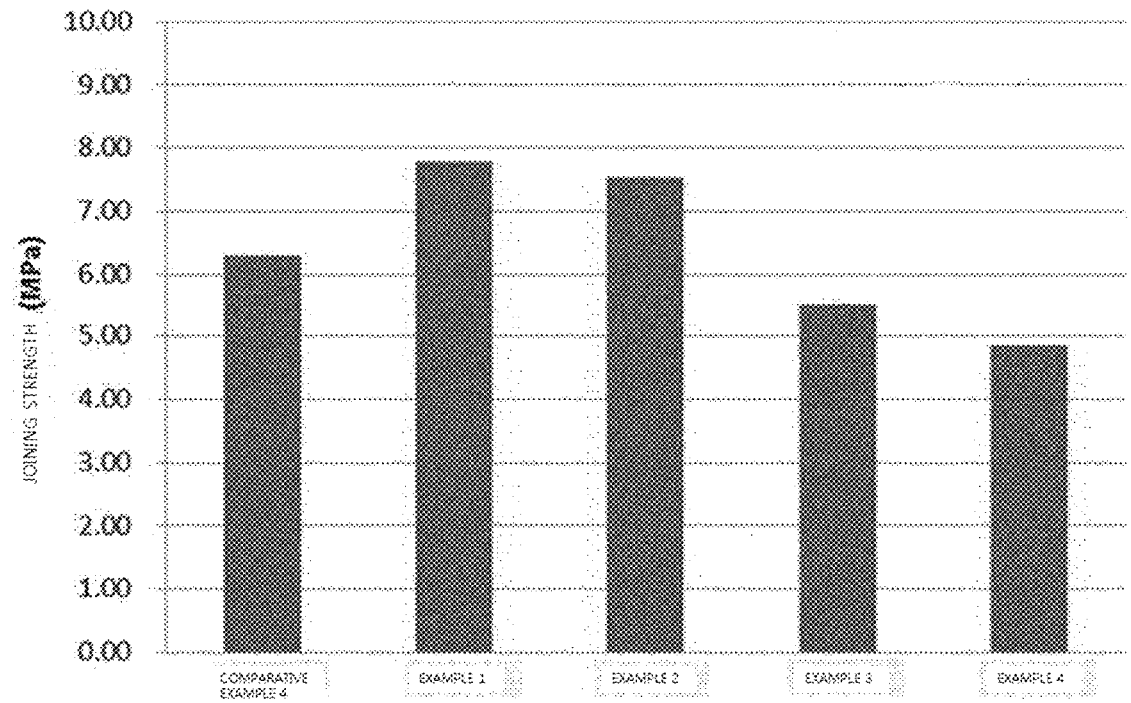
[Figure 10]
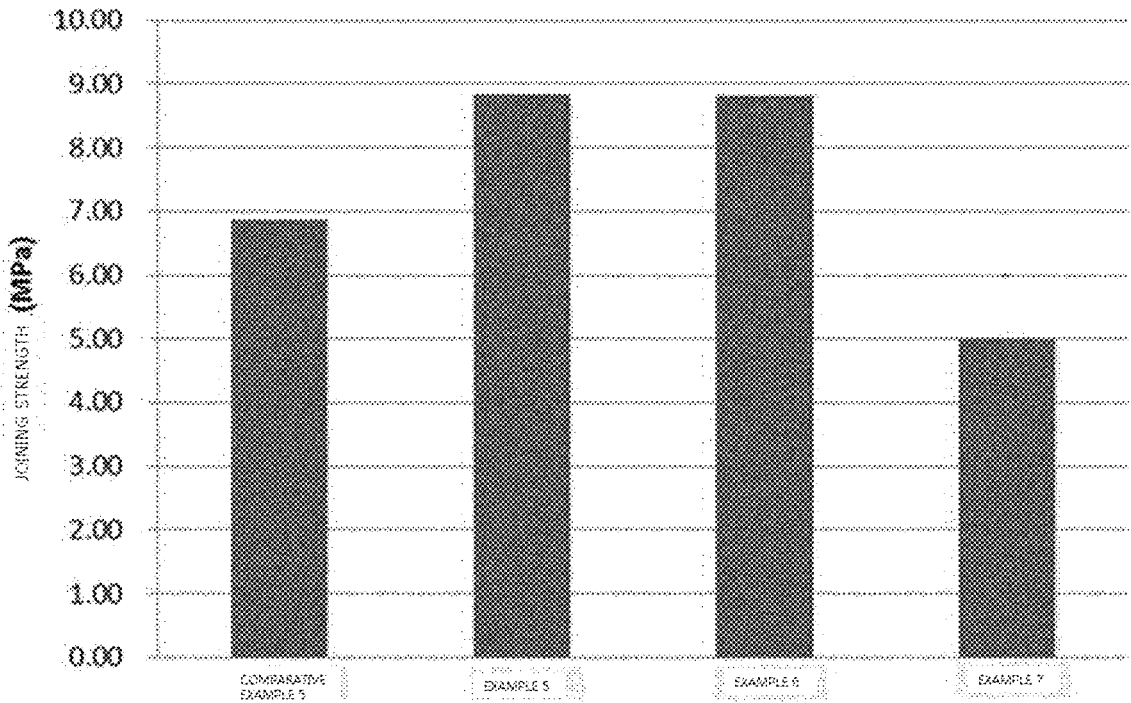

[Figure 11]
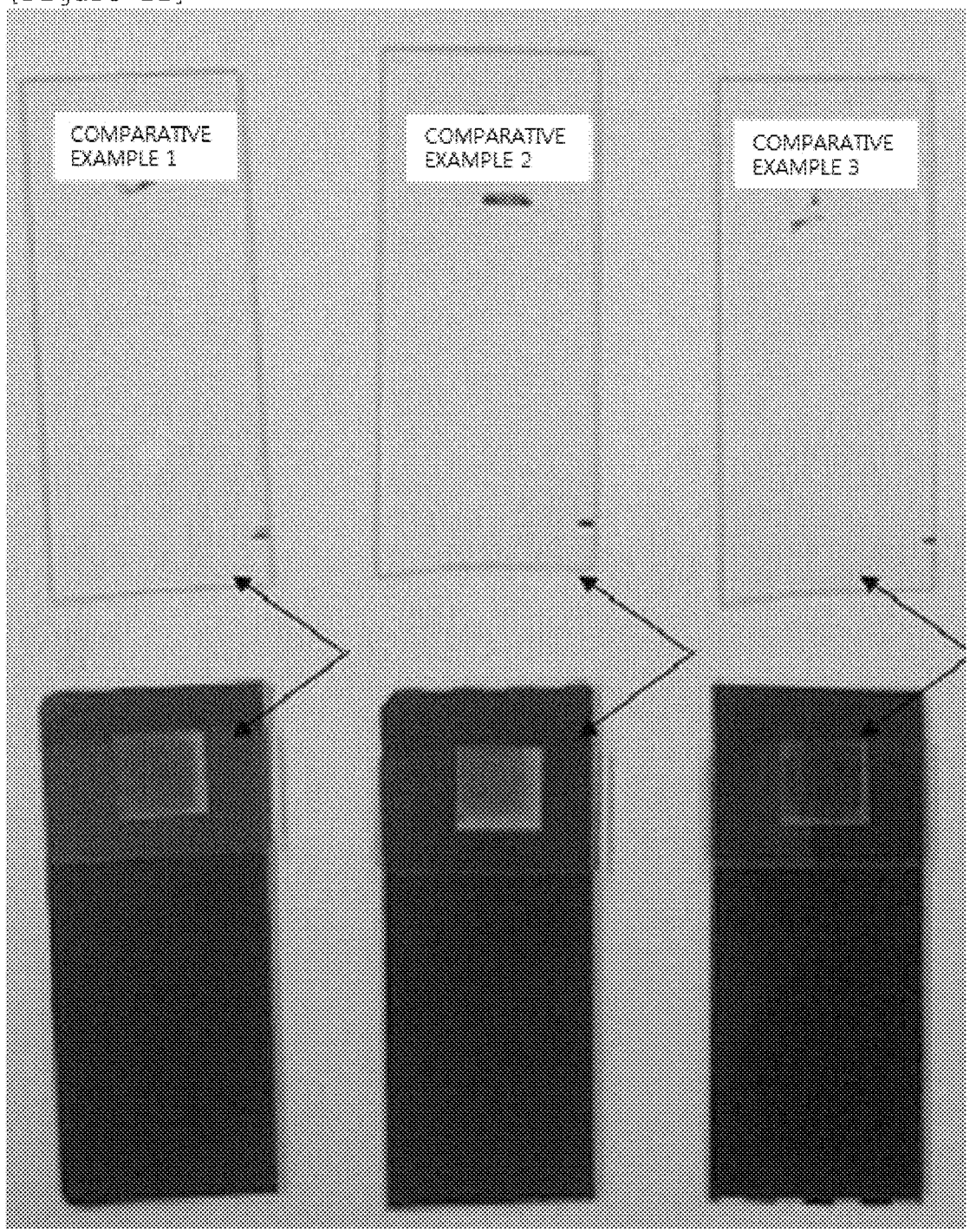

METHOD OF MANUFACTURING HETEROGENEOUS MATERIAL JOINED BODY

CROSS-REFERENCE TO RELATED APPLICATIONS

This application is the U.S. national stage of international Application No. PCT/KR2018/012050 filed Oct. 12, 2018, and claims priority to and the benefit of Korean Patent Application No. 10-2017-0132736 filed in the Korean Intellectual Property Office on Oct. 12, 2017, the entire contents of which are incorporated herein by reference.

FIELD

The present invention relates to a method of manufacturing a heterogeneous material joined body.

BACKGROUND

Various research for joining the heterogeneous kinds of material having various material properties and fixing both materials, particularly, research for improving joining force of glass and plastic materials, are continuously processed.

Further, research on a method of manufacturing a heterogeneous material joined body so that durability of the heterogeneous material joined body used as cover members and the like of various devices is secured, and it is easy to massively produce the heterogeneous material joined body by simplifying a manufacturing process and decreasing a time taken for the manufacturing process of the heterogeneous material joined body, is continuously processed.

In this respect, in order to join heterogeneous materials having different properties in the related art, a method of separately applying a bonding agent between the heterogeneous materials or an insert molding method of melting a material having a lower melting point among the heterogeneous materials at a high temperature to fix the material to one side, and the like are used.

However, the method of manufacturing the heterogeneous material joined body by using the separate bonding agent takes a long required time for hardening the bonding agent, so there is a problem in that process efficiency decreases, and a total thickness of the heterogeneous material joined body increases, so there is a difficulty in sufficiently securing a bonding property.

In addition, a method of separately applying heat, such as the insert molding has a problem in that the material at one side is denaturalized by heat.

Accordingly, there is a need for research on a method of manufacturing a heterogeneous material joined body in order to secure a high bonding property, minimize damage to a material, and secure economic feasibility through a relatively simple process.

Relevant Patent Document

Korean Patent Application Laid-Open No. 10-2015-0064567

SUMMARY

The present invention is to provide a method of manufacturing a heterogeneous material joined body.

An object to be solved in the present invention is not limited to the aforementioned objects, and other objects non-mentioned herein will be clearly understood by those skilled in the art from descriptions below.

An exemplary embodiment of the present invention provides a method of manufacturing a heterogeneous material joined body, wherein the method includes: irradiating a first laser to a surface of a glass layer to form two or more etched lines on the surface of the glass layer; providing a resin layer on the glass layer with the etched lines formed; and irradiating a second laser to the surface of the glass layer with the resin layer provided, so that the etched lines and the surface of the glass layer are filled with the resin layer to join the resin layer and the glass layer, wherein light transmissivity of the glass layer with the etched lines formed at a wavelength of 1,064 nm to light transmissivity at a wavelength of the glass layer at 1,064 nm is 40% or more and 98% or less, and the second laser is irradiated in a direction from the glass layer to the resin layer with defocus on the surface of the glass layer, which is in contact with the resin layer.

The method of manufacturing the heterogeneous material joined body according to the exemplary embodiment of the present invention has an advantage in that it is possible to provide a heterogeneous material joined body having excellent joining force between heterogeneous materials.

According to the method of manufacturing the heterogeneous material joined body according to the exemplary embodiment of the present invention, it is possible to minimize damage to each of the heterogeneous materials generable during a process of joining the heterogeneous materials.

The method of manufacturing the heterogeneous material joined body according to the exemplary embodiment of the present invention has an advantage in that it is possible to provide join materials having different material properties through a relatively simple process.

BRIEF DESCRIPTION OF DRAWINGS

FIG. 2A is a surface view of a glass layer with etched lines formed, according to the exemplary embodiment of the present invention.

FIG. 2B is a lateral cross-sectional view of a glass layer with etched lines formed, according to the exemplary embodiment of the present invention.

FIG. 3 is an illustration of the relative light transmissivity of each of the glass layers with etched lines formed at a wavelength of 1,064 mm, according to Preparation Examples 2-1 to 2-3, and Preparation Examples 3-1 to 3-3.

FIG. 4 is an illustration of the relative light transmissivity of each of the glass layers with etched lines formed at a wavelength of 1,064 mm, according to Preparation Examples 2-4, 2-5, and 2-7, and Preparation Examples 3-4 to 3-6.

FIG. 5 is a scanning electron microscope image of a surface and a lateral cross-section of each of the glass layers with etched lines formed, according to Preparation Examples 2-4, 2-5, and 2-7, and Preparation Examples 3-4 to 3-6.

FIG. 6 is a scanning electron microscope image of lateral cross-sections of heterogeneous material joined bodies according to Comparative Examples 1 to 3.

FIG. 7 is a scanning electron microscope image of lateral cross-sections of heterogeneous material joined bodies according to Examples 2 and 6.

FIGS. 8A-8C are illustrations of a method of measuring joining strength of a heterogeneous material joined body according to an exemplary embodiment of the present invention.

FIG. 9 plots of the joining strength of heterogeneous material joined bodies according to Examples 1 to 4 and Comparative Example 4.

FIG. 10 plots of the joining strength of heterogeneous material joined bodies according to Examples 5 to 7 and Comparative Example 5.

FIG. 11 is a digital camera image of a specimen for measuring joining strength of heterogeneous material joined bodies according to Comparative Examples 1 to 3.

DETAILED DESCRIPTION

Figure 1A:
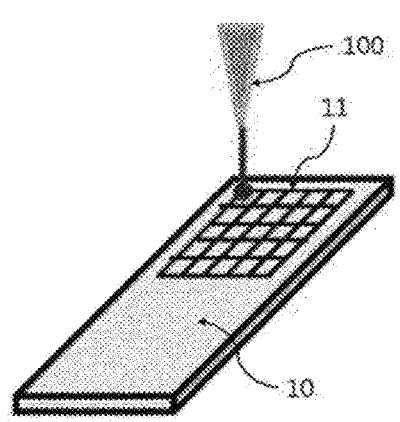
FIGS. 1A and 1B are schematic illustrations of a method of manufacturing a heterogeneous material joined body according to an exemplary embodiment of the present invention.

Throughout the specification of the present application, when an element is referred to as being "on" another element, this includes the case where the element is in contact with another element, and the case where another element is present between the two elements.

Throughout the specification of the present application, when a specific portion "comprises" a specific element", the word "comprise" will be understood to imply the inclusion of stated elements but not the exclusion of any other elements unless explicitly described to the contrary.

The term, "an operation (of) ~" or "an operation of ~" used throughout the specification of the present application does not mean "an operation for ~".

The present inventors researched on various methods for joining heterogeneous materials having various material properties without applying a separate bonding agent and without using a heating method, such as insert molding, and finally made the present invention.

Particularly, the present inventors invented a method of manufacturing a heterogeneous material joined body with one or more etched lines formed on a surface of a glass layer by irradiating a laser, providing a resin layer on the glass layer, irradiating a laser to the surface of the glass layer with the resin layer provided, and particularly specifying a direction and a focal point of the laser irradiated to the surface of the glass layer with the resin layer provided, so that the etched lines and a surface of the glass layer are filled with the resin layer to fix the resin layer.

Hereinafter, the present invention will be described in more detail.

An exemplary embodiment of the present invention provides a method of manufacturing a heterogeneous material joined body, the method includes: irradiating a first laser to a surface of a glass layer to form two or more etched lines on the surface of the glass layer; providing a resin layer on the glass layer with the etched lines formed; and irradiating a second laser to the surface of the glass layer side with the resin layer provided, so that the etched lines and the surface of the glass layer are filled with the resin layer to join the resin layer and the glass layer, wherein light transmissivity of the glass layer with the etched lines formed at a wavelength of 1,064 nm to light transmissivity of the glass layer at a wavelength of 1,064 nm is 40% or more and 98% or less, and the second laser is irradiated in a direction from the glass layer to the resin layer with focus on the surface of the glass layer which is in contact with the resin layer.

Hereinafter, the manufacturing method will be described in more detail based on each operation.

Operation of Forming Etched Lines on a Surface of a Glass Layer

According to the exemplary embodiment of the present invention, the method of manufacturing the heterogeneous material joined body includes an operation of irradiating a first laser to a surface of a glass layer to form two or more etched lines on the surface of the glass layer.

According to the exemplary embodiment of the present invention, the glass layer may include at least one of borosilicate glass, lead-alkali glass, aluminosilicate glass, fused silica glass, germanium oxide glass, germanium selenide glass, heat strengthened glass, and ion strengthened glass.

Particularly, the borosilicate glass may be borosilicate glass (including silicic acid of 80% and boracic acid powder of 14%) of the registered trademark PYREX of the Corning Company, and the heat strengthened glass may be the glass obtained by heat and pressure processing plate glass, and then quenching the processed plate glass with air.

When the glass layer is soda lime glass, there may be a problem in that a crack is seriously formed on the surface of the glass layer according to the irradiation of the first laser, and the heterogeneous material joined body manufactured with the soda lime glass may have a problem in that the glass layer itself is fractured during the stretch.

However, the glass layer according to the exemplary embodiment of the present invention includes at least one of the borosilicate glass and the strengthened glass in order to minimize the generation of the crack on the surface of the glass layer due to the irradiation of the first laser, and thus it is possible to solve the problem in that the glass layer itself is fractured during the stretch in the heterogeneous material joined body manufactured with the soda lime glass.

According to the exemplary embodiment of the present invention, two or more etched lines may be formed on the surface of the glass layer. Further, the etched line may mean one region of the glass layer etched according to the irradiation of the first laser.

Figure 1B:
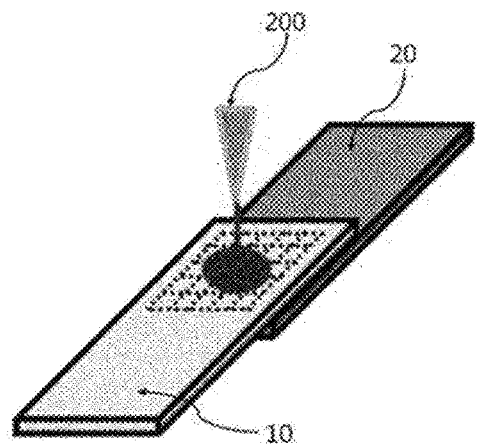

FIGS. 1A and 1B are schematic illustrations of the method of manufacturing the heterogeneous material joined body according to the exemplary embodiment of the present invention. Particularly, FIG. 1A is a schematic diagram of the operation of forming the etched lines on the surface of the glass layer.

As illustrated in FIG. 1A, in the operation of forming the etched lines on the surface of the glass layer, two or more etched lines 11 may be formed on a surface of the glass layer 10 by irradiating a first laser 100 to the surface of the glass layer 10. Further, the two or more etched lines 11 formed according to the irradiation of the first laser 100 are represented with solid lines in a region corresponding to the surface of the glass layer 10 in FIG. 1A.

Further, according to the exemplary embodiment of the present invention, the two or more etched lines may be formed according to the irradiation of two or more first lasers having different process directions.

According to the exemplary embodiment of the present invention, the two or more etched lines may be spaced apart from and/or cross each other. Particularly, when the progress directions of the two or more first lasers are parallel, the two or more etched lines may be formed while being spaced apart from each other, and when the progress directions of the two or more first lasers are not parallel, the two or more etched lines may be formed while crossing each other.

The two or more etched lines are formed on the glass layer according to the irradiation of the first laser, so that it is possible to improve joining force of the glass layer with a resin layer provided on the glass layer. Further, when the two or more etched lines cross, a mesh pattern surrounded by the etched lines may be formed on the surface of the glass layer.

According to the exemplary embodiment of the present invention, the etched lines may form a regular mesh pattern. For example, the mesh pattern may be a pattern of a circular shape, a curved shape, a triangular shape, a quadrangular shape, or a honeycomb shape. The foregoing various forms of mesh patterns are formed on the surface of the glass layer, so that it is possible to improve joining force with the resin layer provided on the glass layer.

FIG. 2A is a surface view of the glass layer with etched lines formed, according to the exemplary embodiment of the present invention, and FIG. 2B is a lateral cross-section view of the glass layer with etched lines formed, according the exemplary embodiment of the present invention.

As illustrated in FIG. 2A, when the two or more etched lines 11 cross each other, particularly, are orthogonal to each other, the mesh pattern 12 surrounded by the etched lines may be formed on the surface of the glass layer.

According to the exemplary embodiment of the present invention, the mesh pattern and the etched lines formed on the surface of the glass layer are filled with the resin layer, so that the resin layer and the glass layer may be joined, which will be described below in a joining operation.

According to the exemplary embodiment of the present invention, a thickness of the glass layer may be 1.5 mm or more and 10 mm or less, or 2 mm or more and 10 mm or less. When the first laser is irradiated to the glass layer having the thickness in the range, there are advantages in that a decrease width of strength of the glass layer according to the irradiation of the second laser is small, and it is possible to improve the joining force with the resin layer during the process of joining the glass layer to the resin layer by irradiating the second laser.

According to the exemplary embodiment of the present invention, a depth of the etched line from the surface of the glass layer may be 10 μm or more and 300 μm or less, 10 μm or more and 260 μm or less, 30 μm or more and 300 μm or less, or 30 μm or more and 260 μm or less. When the depth of the etched line from the surface of the glass layer is within the foregoing range, the surface of the glass layer and the etched lines on the glass layer may be sufficiently filled with the resin layer, thereby maximizing joining force of the heterogeneous materials. Particularly, in case of adjusting the depth of the etched line from the surface of the glass layer to the foregoing range, it is possible to effectively suppress the problems in that the glass layer and the resin layer are not smoothly joined, and the glass layer is fractured, and thus the joining force between the glass layer and the resin layer decreases.

However, the depth of the etched line from the surface of the glass layer may be appropriately adjusted under an irradiation condition of the first laser.

In the present specification, the term "joining force" may mean force required for detaching the joined glass layer and the resin layer.

FIG. 2B is a lateral cross-sectional view according to the etched lines of the glass layer with the etched lines formed, according to the exemplary embodiment of the present invention. As illustrated in FIG. 2B, two or more etch recesses 13 may be formed while being spaced apart from each other on the surface of the glass layer 10 according to the irradiation of the first laser.

In the present specification, the term "the depth of the etched line from the surface of the glass layer" may mean a length of a vertical line from a distal end of one side of the etch recess 13 to the surface of the glass layer 10.

According to the exemplary embodiment of the present invention, a pitch of the two or more etched lines may be 50 μm or more and 1,200 μm or less, 50 μm or more and 1,000 μm or less, 50 μm or more and 600 μm or less, 70 μm or more and 1,200 μm or less, 70 μm or more and 1,000 μm or less, 70 μm or more and 600 μm or less, 100 μm or more and 1,200 μm or less, 100 μm or more and 1,000 μm or less, or 100 μm or more and 600 μm or less.

In the range, after the resin layer is joined, the surface of the glass layer and the etched lines on the glass layer may be sufficiently filled with the resin layer, and thus, the resin layer is not easily peeled from the glass layer and joining force between the resin layer and the glass layer may be highly maintained. Particularly, by adjusting the pitch of the two or more etched lines to the foregoing range, it is possible to suppress a problem in that the second lasers overlap and are irradiated to damage the mesh pattern formed on the glass layer, and a problem in that the second laser is not sufficiently irradiated, so that joining force between the glass layer and the resin layer is not sufficiently secured.

However, the pitch of the two or more etched lines may be appropriately adjusted according to an irradiation condition of the irradiated first laser, a component included in the glass layer with the etched lines formed, and a thickness of the glass layer.

In the present specification, the term "the pitch of the etched lines" may mean a very short range between the spaced etched lines when the etched lines are formed on the surface of the glass layer.

Further, according to the exemplary embodiment of the present invention, after the two or more etched lines are formed on the surface of the glass layer, two or more reinforcement etched lines may be further formed on the surface of the glass layer by additionally irradiating the first laser.

According to the exemplary embodiment of the present invention, a pitch of the two or more reinforcement etched lines may be 10 μm or more and 100 μm or less, 10 μm or more and 50 μm or less, 30 μm or more and 100 μm or less, or 30 μm or more and 50 μm or less. The reinforcement etched lines are further formed and the pitch of the reinforcement etched lines is adjusted to the range, thereby further improving joining force between the glass layer and the resin layer.

According to the exemplary embodiment of the present invention, a width of the etched line may be 20 μm or more and 100 μm or less, 20 μm or more and 80 μm or less, 30 μm or more and 100 μm or less, or 30 μm or more and 80 μm or less. However, the width of the etched line is not limited thereto, and may be changed according to the irradiation condition of the irradiated first laser, and may be appropriately adjusted according to a material included in the glass layer and a thickness of the glass layer.

When the resin layer is joined to the glass layer in the foregoing range, the surface of the glass layer and the etched lines may be sufficiently filled with the resin layer, thereby maximizing joining force between the glass layer and the resin layer.

In the present specification, the term "the width of the etched line" may mean a thickness or a width of one etched line formed on the surface of the glass layer.

According to the exemplary embodiment of the present invention, the first laser may be a pico second pulse laser.

In the present specification, the term "the pulse laser" may mean a laser having temporal oscillation and stoppage.

In the present specification, the term "the pulse width" may mean an interval of a time, at which an amplitude becomes half between an increasing time and a decreasing time of the pulse laser.

In the present specification, the term "the pico second laser" may mean a laser, in which a unit of a pulse width is $10^{-12}$ seconds.

That is, in the present specification, the term "the pico second pulse laser" is the laser having temporal oscillation and stoppage, and may mean the laser, in which a unit of an interval of time, at which an amplitude becomes half, between an increasing time and a decreasing time of the pulse laser is $10^{-12}$ seconds.

According to the exemplary embodiment of the present invention, an ultrashort wave laser, such as the pico second pulse, is irradiated to the glass layer, so that it is possible to minimize damage to the glass layer due to the irradiation of the pico second pulse laser and form the etched lines forming the regular mesh pattern on the glass layer.

According to the exemplary embodiment of the present invention, regarding the first laser irradiated to the surface of the glass layer, the two or more first lasers may be irradiated to the surface of the glass layer while being spaced apart from each other.

According to the exemplary embodiment of the present invention, an irradiation gap interval of the first lasers may be 50 μm or more and 1,200 μm or less, 50 μm or more and 1,000 μm or less, 50 μm or more and 600 μm or less, 70 μm or more and 1,200 μm or less, 70 μm or more and 1,000 μm or less, 70 μm or more and 600 μm or less, 100 μm or more and 1,200 μm or less, 100 μm or more and 1,000 μm or less, or 100 μm or more and 600 μm or less. In the foregoing range, the etched lines having the foregoing pitch may be formed on the surface of the glass layer.

In the present specification, the term "the irradiation interval of a laser" may mean the shortest distance between the laser irradiations while being spaced apart from each other.

According to the exemplary embodiment of the present invention, the number of times of the irradiation of the first laser may be 1 time or more and 50 times or less, or 1 time or more and 40 times or less. When the number of times of the irradiation of the first laser is within the foregoing range, it is possible to minimize damage to the glass layer and form the etched lines forming the regular mesh pattern on the glass layer. Further, the number of times of the irradiation of the first laser may be appropriately adjusted according to a thickness of the glass layer and a property of the glass layer.

In the present specification, the term "the number of times of the irradiation of the laser" may mean the number of times of the repeated irradiation of the laser to the same region. That is, the number of times of the irradiation of the first laser may mean the number of times of the repeated irradiation of the first laser to one etched line formed on the surface of the glass layer.

According to the exemplary embodiment of the present invention, an output of the first laser may be 10 W or more and 50 W or less, 10 W or more and 40 W or less, 30 W or more and 50 W or less, or 30 W or more and 40 W or less. When the output of the first laser is within the foregoing range, it is possible to minimize damage to the glass layer, maximize joining force between the glass layer and the resin layer, and regularly maintain the mesh pattern formed on the glass layer. Particularly, the output of the first laser is adjusted to the foregoing range, so that it is possible to prevent a problem in that a risk of damaging the surface of the glass layer is later generated by which a long time is required for forming the etched lines on the surface of the glass layer, and a problem in that equipment, which is capable of irradiating the first laser, is damaged.

According to the exemplary embodiment of the present invention, an irradiation speed of the first laser may be 50 mm/s or more and 500 mm/s or less, 50 mm/s or more and 125 mm/s or less, 50 mm/s or more and 100 mm/s or less, 75 mm/s or more and 500 mm/s or less, 75 mm/s or more and 125 mm/s or less, 75 mm/s or more and 100 mm/s or less, 100 mm/s or more and 500 mm/s or less, 100 mm/s or more and 125 mm/s or less, or 100 mm/s. In the foregoing range, it is possible to minimize damage to the glass layer, maximize joining force between the glass layer and the resin layer, and regularly maintain the mesh pattern formed on the glass layer. However, the irradiation speed of the first laser may be appropriately adjusted according to a property condition of the glass layer.

In the present specification, the "irradiation speed" of the laser may mean a value obtained by dividing a movement distance of the irradiated laser from one side distal end to the other side distal end by an irradiation time.

According to the exemplary embodiment of the present invention, a repetition rate of the first laser may be 100 kHz or more and 300 kHz or less. In the foregoing range, it is possible to minimize damage to the glass layer and regularly maintain the mesh pattern formed on the glass layer. However, the repetition rate of the first laser may be appropriately adjusted according to a property condition of the glass layer.

In the present specification, the term "the repetition rate" of the laser may mean the number of times of repeated collision of the irradiated laser with an adherend per unit time.

According to the exemplary embodiment of the present invention, a wavelength of the first laser may be 200 nm or more and 600 nm or less, 200 nm or more and 400 nm or less, 200 nm or more and 360 nm or less, 300 nm or more and 600 nm or less, 300 nm or more and 400 nm or less, 300 nm or more and 360 nm or less, 330 nm or more and 600 nm or less, 330 nm or more and 400 nm or less, or 330 nm or more and 360 nm or less. In the foregoing range, it is possible to minimize damage to the glass layer due to the irradiation of the first laser when the etched lines are formed on the glass layer.

According to the exemplary embodiment of the present invention, light transmissivity of the glass layer with the etched lines formed at a wavelength of 1,064 nm to light transmissivity of the glass layer at a wavelength of 1,064 nm is 40% or more and 98% or less.

Particularly, light transmissivity of the glass layer with the etched lines formed at a wavelength of 1,064 nm by the irradiation of the first laser to light transmissivity of the glass layer, to which the first laser is not irradiated, at a wavelength of 1,064 nm, may be 40% or more and 98% or less. In the foregoing range, the second laser is sufficiently transmitted when the second laser is later irradiated, so that the resin layer and the glass layer may be smoothly joined.

In the present specification, the term "the light transmissivity" may mean a percentage of the amount of light transmitting a radiated body to the amount of light irradiated to the radiated body of the light having a specific wavelength.

Operation of Providing the Resin Layer on the Glass Layer with the Etched Lines Formed According to the exemplary embodiment of the present invention, the method of manufacturing a heterogeneous material joined body includes an operation of providing the resin layer on the glass layer with the etched lines formed.

Particularly, the resin layer may be provided on one surface of the glass layer with the etched lines formed.

According to the exemplary embodiment of the present invention, the resin layer may include at least one of a polypropylene (PP) resin, a polyamide (PA) resin, a polyphenylene oxide (PPO) resin, a poly(acrylonitrile-butadiene-styrene) (poly(ABS)) resin, a polybutylene terephthalate (PBT) resin, a polycarbonate (PC) resin, a polycarbonate/acrylonitrile-butadiene-styrene (PC/ABS) resin, a polyethylene terephthalate (PET) resin, high density polyethylene (HDPE), low density polyethylene (LDPE), a polyimide (PI) resin, a polystyrene (PS) resin, a polytetrafluoroethylene (PTFE) resin, and stiffener additives thereof. However, the resin layer is not limited thereto, and a resin may be appropriately selected from the resins known in the art as long as the resin is melted under the irradiation condition of the laser and the etched lines and the surface of the glass layer are filled with the resin to fix the resin.

Further, according to the exemplary embodiment of the present invention, the stiffener may be at least one of glass fiber, talc, and carbon fiber. Further, the resin layer may be a polypropylene resin including talc of 20%.

However, the kind of stiffener is not limited, and a stiffener may be appropriately selected from the stiffeners known in the art as long as the stiffener is addable for improving strength of a general resin.

According to the exemplary embodiment of the present invention, a thickness of the resin layer may be 0.5 mm or more and 10 mm or less, or 2 mm or more and 10 mm or less. In the foregoing range, the glass layer and the resin layer may be sufficiently joined, and it is possible to prevent a phenomenon that the resin layer swells due to the irradiation of the second laser.

Operation of Joining

The method of manufacturing the heterogeneous material joined body according to the exemplary embodiment of the present invention includes a joining operation, in which the second laser is irradiated to the surface of the glass layer with the resin layer provided, so that the etched lines and the surface of the glass layer are filled with the resin layer to join the resin layer and the glass layer.

In the related art, a heterogeneous material joined body is manufactured by using a method of applying an adhesive agent onto at least one of the resin layer and the glass layer and then laminating the resin layer and the glass layer, or a method of filling the glass layer with the resin layer to fix the resin layer by heating the resin layer.

However, the foregoing method has a problem in that a total thickness of the heterogeneous material joined body excessively increases as described above, which thus fails to meet lightness and compactness trends of various members by using the heterogeneous material joined body, and a problem in that the resin layer is damaged due to heat.

However, in the method of manufacturing the heterogeneous material joined body according to the exemplary embodiment of the present invention, not that a separate adhesive layer is provided between the glass layer and the resin layer or the entire resin layer is separately melted in order to join the resin layer and the glass layer, but partial melting of the resin layer is induced by irradiating the laser to the surface of the glass layer with the resin layer provided, and the glass layer and the resin layer are joined, so that there is an advantage in that it is possible to minimize a total thickness of the heterogeneous material joined body and denaturalization of the resin layer.

According to the exemplary embodiment of the present invention, the second laser may be irradiated to the surface of the glass layer side with the resin layer provided. Particularly, the second laser may be the laser irradiated to the surface of the glass layer when the resin layer is provided so as to be in contact with one surface of the glass layer, on which the etched lines are formed.

FIG. 1B is a schematic illustration of the joining operation according to the exemplary embodiment of the present invention. A region indicated with a dotted line in FIG. 1B represents the other side surface of the glass layer 10, on which the etched lines are formed, and also represents the state where one surface of the glass layer 10, on which the etched lines are formed, is in contact with the resin layer 20.

Further, as illustrated in FIG. 1B, the joining operation may be performed by providing the resin layer 20 on the glass layer 10 and irradiating the second laser 200 onto the glass layer with the resin layer formed.

According to the exemplary embodiment of the present invention, in the joining operation, the etched lines and the surface of the glass layer may be filled with the resin layer according to the irradiation of the second laser and the resin layer may be joined, and particularly, the etched lines and the mesh pattern on the surface of the glass layer may be filled with the resin layer to join the resin layer.

According to the exemplary embodiment of the present invention, the second laser may be irradiated in the direction from the glass layer to the resin layer, and particularly, the second laser may be irradiated to the surface of the glass layer with the resin layer provided, in the direction from the glass layer to the resin layer. Further, the second laser may not be directly irradiated to the resin layer.

According to the exemplary embodiment of the present invention, when the second laser is irradiated in the direction from the glass layer to the resin layer, it is possible to decrease damage to the resin layer by heat compared to the case where the second laser is directly irradiated to the resin layer. Further, the second laser is irradiated only to the necessary region for joining the resin layer and the glass layer, so that it is possible to improve joining force between the resin layer and the glass layer and decrease damage to the resin layer due to the supply of energy.

According to the exemplary embodiment of the present invention, the second laser may be irradiated with focus on the surface of the glass layer which is in contact with the resin layer. Further, the second laser may be irradiated with defocus on the surface of the glass layer which is in contact with the resin layer.

Particularly, when the second laser is irradiated with defocus, the second laser may be irradiated with focus on the other surface of the glass layer which is not in contact with the resin layer, and the second laser may be out of focus (defocus) on the resin layer and be widely irradiated to the resin layer.

According to the exemplary embodiment of the present invention, the second laser may penetrate and be irradiated to the glass layer. That is, the second laser may penetrate and be irradiated to the glass layer, and the resin layer may absorb energy according to the irradiation of the second laser. Accordingly, the adsorbed energy of the second laser may be converted to heat and the resin layer is partially melted to be joined to the glass layer with the etched lines formed.

The second laser penetrates and is irradiated to the glass layer in the foregoing direction under the foregoing condition, so that it is possible to minimize a problem in that the resin layer is damaged when the second laser is directly irradiated to the resin layer and the like, and simultaneously increase joining force between the resin layer and the glass layer.

According to the exemplary embodiment of the present invention, the second laser may be a fiber pulse laser.

In the specification, the term "the fiber pulse laser" may mean an optical fiber pulse laser commonly used in the art, particularly, a pulse laser having an active medium (for example, Yttrium Aluminum Garnet) in optical fiber.

According to the exemplary embodiment of the present invention, an output of the second laser may be 5 W or more and 100 W or less, 5 W or more and 60 W or less, 5 W or more and 50 W or less, 30 W or more and 100 W or less, 30 W or more and 60 W or less, 30 W or more and 50 W or less, 40 W or more and 100 W or less, 40 W or more and 60 W or less, or 40 W or more and 50 W or less. In the foregoing range, it is possible to minimize damage to the glass layer, which the second laser penetrates, and the resin layer, to which the second laser is irradiated, and simultaneously maximize joining force between the glass layer and the resin layer.

According to the exemplary embodiment of the present invention, an irradiation speed of the second laser may be 20 mm/s or more and 500 mm/s or less, 20 mm/s or more and 300 mm/s or less, 20 mm/s or more and 200 mm/s or less, 50 mm/s or more and 500 mm/s or less, 50 mm/s or more and 300 mm/s or less, 50 mm/s or more and 200 mm/s or less, 100 mm/s or more and 500 mm/s or less, 100 mm/s or more and 300 mm/s or less, or 100 mm/s or more and 200 mm/s or less. In the foregoing range, the second laser may sufficiently penetrate and be irradiated to the glass layer, and the glass layer and the etched lines provided on the surface of the glass layer are appropriately filled with the resin layer, so that the resin layer may be strongly joined to the glass layer. However, the irradiation speed of the second laser may be appropriately adjusted according to the properties of the glass layer and the resin layer.

According to the exemplary embodiment of the present invention, the number of times of the irradiation of the second laser may be 1 time or more and 40 times or less, 3 times or more and 40 times or less, 1 time or more and 20 times or less, or 3 times or more and 20 times or less. In the foregoing range, the second laser may sufficiently penetrate and be irradiated to the glass layer, and the glass layer and the etched lines provided on the surface of the glass layer are appropriately filled with the resin layer, so that the resin layer may be strongly joined to the glass layer. However, the number of times of the irradiation of the second laser may be appropriately adjusted according to the properties of the glass layer and the resin layer.

According to the exemplary embodiment of the present invention, the number of times of the irradiation of the second laser has been described before.

According to the exemplary embodiment of the present invention, an irradiation interval of the second laser may be 100 μm or more and 2,000 μm or less, 100 μm or more and 1,000 μm or less, 200 μm or more and 2,000 μm or less, or 200 μm or more and 1,000 μm or less. The range is the broader range than the irradiation interval of the first laser, and in the range, the glass layer and the resin layer may be evenly joined. Accordingly, there are advantages in that it is possible to maximize joining force between the glass layer and the resin layer, and minimize damage to the glass layer and the resin layer according to the irradiation of the second laser.

According to the exemplary embodiment of the present invention, a wavelength of the second laser may be 800 nm or more and 1,400 nm or less, 800 nm or more and 1,200 nm or less, 800 nm or more and 1,100 nm or less, 900 nm or more and 1,400 nm or less, 900 nm or more and 1,200 nm or less, 900 nm or more and 1,100 nm or less, 1,000 nm or more and 1,400 nm or less, 1,000 nm or more and 1,200 nm or less, or 1,000 nm or more and 1,100 nm or less. The wavelength of the second laser is a longer wavelength than the wavelength of to the first laser, and there are advantages in that the glass layer and the resin layer may be efficiently joined through the irradiation of the second laser, and it is possible to minimize damage to each of the glass layer and the resin layer due to the irradiation of the second laser.

According to the exemplary embodiment of the present invention, the joining force of the heterogeneous material joined body may be 4 MPa or more and 10 MPa.

In the present specification, the joining force of the heterogeneous material joined body may mean a maximum tension load when the heterogeneous material joined body is joined so that a joining area is 5 mm×5 mm, and then both distal ends of the heterogeneous material joined body are stretched at a speed of 10 mm/min.

That is, the joining force of the heterogeneous material joined body may mean maximum tensile strength of the heterogeneous material joined body, particularly, maximum tensile load of 4 MPa or more and 10 MPa or less, at which a joined portion of the heterogeneous material joined body is fractured. The range may mean that the heterogeneous material joined body according to the exemplary embodiment of the present invention may implement the range of the considerably larger values than the range implementable by the general heterogeneous material joined body, in which glass and a resin are joined.

DESCRIPTION OF REFERENCE NUMERALS

10: Glass layer
11: Etched line
12: Mesh pattern
13: Etch recess
20: Resin layer
100: First laser
200: Second laser

MODE FOR CARRYING OUT THE INVENTION

Hereinafter, the present invention will be described in detail based on Examples. However, Examples according to the present invention may be modified into other various forms, and it is not construed that the scope of the present invention is limited to Examples described below. Examples of the present specification are provided for more completely explaining the present invention to those skilled in the art.

Reference Example 1

Soda lime glass having a thickness of 1 mm was prepared.

Preparation Example 1-1

Etched lines were formed on a surface of a glass layer by irradiating a pico second laser having a wavelength of 355 nm, an output of 45 W, and a repetition rate of 100 kHz to the soda lime glass having the thickness of 1 mm by using Trimicro 5000 made by the TRUMPF Company at an irradiation speed of 100 mm/s with an irradiation interval of 0.2 mm 20 times.

Preparation Example 1-2

Etched lines were formed on a surface of a glass layer by the same method as that of Preparation Example 1-1, except for an irradiation interval of 0.6 mm.

Preparation Example 1-3

Etched lines were formed on a surface of a glass layer by the same method as that of Preparation Example 1-1, except for an irradiation interval of 1.0 mm.

Reference Example 2

Borosilicate glass (Pyrex, Corning Company) having a thickness of 2.2 mm was prepared.

Preparation Example 2-1

Etched lines were formed on a surface of a glass layer by irradiating a pico second laser having a wavelength of 355 nm, an output of 45 W, and a repetition rate of 100 kHz to the borosilicate glass (Pyrex, Corning Company) having the thickness of 2.2 mm by using Trimicro 5000 made by the TRUMPF Company at an irradiation speed of 100 mm/s with an irradiation interval of 0.2 mm 20 times.

Preparation Example 2-2

Etched lines were formed on a surface of a glass layer by the same method as that of Preparation Example 2-1, except for an irradiation interval of 0.6 mm.

Preparation Example 2-3

Etched lines were formed on a surface of a glass layer by the same method as that of Preparation Example 2-1, except for an irradiation interval of 1.0 mm.

Preparation Example 2-4

Etched lines were formed on a surface of a glass layer by irradiating a pico second laser having a wavelength of 355 nm, an output of 40 W, and a repetition rate of 100 kHz to the borosilicate glass (Pyrex, Corning Company) having the thickness of 2.2 mm by using Trimicro 5000 made by the TRUMPF Company at an irradiation speed of 100 mm/s with an irradiation interval of 0.1 mm 10 times.

Preparation Example 2-5

Etched lines were formed on a surface of a glass layer by the same method as that of Preparation Example 2-4, except for an irradiation interval of 0.3 mm.

Preparation Example 2-6

Etched lines were formed on a surface of a glass layer by the same method as that of Preparation Example 2-4, except for an irradiation gap of 0.3 mm and the reinforcement of the irradiation interval to 0.05 mm.

Preparation Example 2-7

Etched lines were formed on a surface of a glass layer by the same method as that of Preparation Example 2-4, except for an irradiation interval of 0.6 mm.

Reference Example 3

Tempered glass (plate glass obtained by heat and pressure processing plate glass and then quenching the processed plate glass with air) having a thickness of 2 mm was prepared.

Preparation Example 3-1

Etched lines were formed on a surface of a glass layer by irradiating a pico second laser having an output of 45 W, a wavelength of 355 nm, and a repetition rate of 100 kHz to the tempered glass (plate glass obtained by heat and pressure processing plate glass and then quenching the processed plate glass with air) having the thickness of 2 mm by using Trimicro 5000 made by the TRUMPF Company at an irradiation speed of 100 mm/s with an irradiation interval of 0.2 mm 20 times.

Preparation Example 3-2

Etched lines were formed on a surface of a glass layer by the same method as that of Preparation Example 3-1, except for an irradiation interval of 0.6 mm.

Preparation Example 3-3

Etched lines were formed on a surface of a glass layer by the same method as that of Preparation Example 3-1, except for an irradiation interval of 1.0 mm.

Preparation Example 3-4

Etched lines were formed on a surface of a glass layer by irradiating a pico second laser having a wavelength of 355 nm, an output of 30 W, and a repetition rate of 100 kHz to the tempered glass having the thickness of 2 mm by using Trimicro 5000 made by the TRUMPF Company at an irradiation speed of 500 mm/s with an irradiation interval of 0.1 mm 20 times.

Preparation Example 3-5

Etched lines were formed on a surface of a glass layer by the same method as that of Preparation Example 3-4, except for an irradiation interval of 0.3 mm.

Preparation Example 3-6

Etched lines were formed on a surface of a glass layer by the same method as that of Preparation Example 3-4, except for an irradiation interval of 0.6 mm.

The manufacturing conditions of Preparation Examples 1-1 to 1-3, Preparation Examples 2-1 to 2-7, and Preparation Examples 3-1 to 3-4 are summarized in Table 1 below.

TABLE 1

| Classi-fication | Kind of glass | Wave-length (nm) | Out-put (W) | Irradi-ation speed (mm/s) | Number of times | Irradi-ation gap (mm) |
|---|---|---|---|---|---|---|
| Preparation Example 1-1 | Soda lime | 355 | 45 | 100 | 20 | 0.2 |
| Preparation Example 1-2 | Soda lime | 355 | 45 | 100 | 20 | 0.6 |
| Preparation Example 1-3 | Soda lime | 355 | 45 | 100 | 20 | 1.0 |

TABLE 1-continued

| Classification | Kind of glass | Wavelength (nm) | Output (W) | Irradiation speed (mm/s) | Number of times | Irradiation gap (mm) |
|---|---|---|---|---|---|---|
| Preparation Example 2-1 | Pyrex 2.2 | 355 | 45 | 100 | 20 | 0.2 |
| Preparation Example 2-2 | Pyrex 2.2 | 355 | 45 | 100 | 20 | 0.6 |
| Preparation Example 2-3 | Pyrex 2.2 | 355 | 45 | 100 | 20 | 1.0 |
| Preparation Example 2-4 | Pyrex 2.2 | 355 | 40 | 100 | 10 | 0.1 |
| Preparation Example 2-5 | Pyrex 2.2 | 355 | 40 | 100 | 10 | 0.3 |
| Preparation Example 2-6 | Pyrex 2.2 | 355 | 40 | 100 | 10 | 0.3(0.05) |
| Preparation Example 2-7 | Pyrex 2.2 | 355 | 40 | 100 | 10 | 0.6 |
| Preparation Example 3-1 | Tempered glass of 2 mm | 355 | 45 | 100 | 20 | 0.2 |
| Preparation Example 3-2 | Tempered glass of 2 mm | 355 | 45 | 100 | 20 | 0.6 |
| Preparation Example 3-3 | Tempered glass of 2 mm | 355 | 45 | 100 | 20 | 1.0 |
| Preparation Example 3-4 | Tempered glass of 2 mm | 355 | 30 | 500 | 20 | 0.1 |
| Preparation Example 3-5 | Tempered glass of 2 mm | 355 | 30 | 500 | 20 | 0.3 |
| Preparation Example 3-6 | Tempered glass of 2 mm | 355 | 30 | 500 | 20 | 0.6 |

Example 1

A polypropylene (stiffener: talc of 20%) resin layer having a thickness of 1 mm was provided on the surface of the glass layer with the etched lines formed according to Preparation Example 2-4.

A heterogeneous material joined body was manufactured by irradiating the second laser to the surface of the glass layer with the resin layer provided, under the condition represented in Table 2 below in a direction from the glass layer to the resin layer with focus on the surface of the glass layer which is in contact with the resin layer, or defocus on the surface of the glass layer which is in contact with the resin layer.

TABLE 2

| Classification | Second laser |
|---|---|
| Manufacturing Company | SPI |
| Equipment name | SPI-R4 |
| Wavelength (nm) | 1064 |
| Spot size (μm) | 82 (defocusing: 170) |
| Output (W) | 50 |
| Irradiation speed (mm/s) | 100 |
| Repetition rate (kHz) | 100 |
| Number of times of irradiation | 3 |
| Irradiation gap (mm) | 1.0 |

Example 2

A heterogeneous material joined body was manufactured by the same method as that of Example 1 except that a polypropylene (stiffener: talc of 20%) resin layer having a thickness of 1 mm was provided on the surface of the glass layer with the etched lines formed according to Preparation Example 2-5.

Example 3

A heterogeneous material joined body was manufactured by the same method as that of Example 1 except that a polypropylene (stiffener: talc of 20%) resin layer having a thickness of 1 mm was provided on the surface of the glass layer with the etched lines formed according to Preparation Example 2-6.

Example 4

A heterogeneous material joined body was manufactured by the same method as that of Example 1 except that a polypropylene (stiffener: talc of 20%) resin layer having a thickness of 1 mm was provided on the surface of the glass layer with the etched lines formed according to Preparation Example 2-7.

Example 5

A heterogeneous material joined body was manufactured by the same method as that of Example 1 except that a polypropylene (stiffener: talc of 20%) resin layer having a thickness of 1 mm was provided on the surface of the glass layer with the etched lines formed according to Preparation Example 3-4.

Example 6

A heterogeneous material joined body was manufactured by the same method as that of Example 1 except that a polypropylene (stiffener: talc of 20%) resin layer having a thickness of 1 mm was provided on the surface of the glass layer with the etched lines formed according to Preparation Example 3-5.

Example 7

A heterogeneous material joined body was manufactured by the same method as that of Example 1 except that a polypropylene (stiffener: talc of 20%) resin layer having a thickness of 1 mm was provided on the surface of the glass layer with the etched lines are formed according to Preparation Example 3-6.

Comparative Example 1

A heterogeneous material joined body was manufactured by the same method as that of Example 1 except that a polypropylene (stiffener: talc of 20%) resin layer having a thickness of 1 mm was provided on the surface of the glass layer with the etched lines formed according to Preparation Example 1-1.

Comparative Example 2

A heterogeneous material joined body was manufactured by the same method as that of Example 1 except that a polypropylene (stiffener: talc of 20%) resin layer having a thickness of 1 mm was provided on the surface of the glass layer with the etched lines formed according to Preparation Example 1-2.

Comparative Example 3

A heterogeneous material joined body was manufactured by the same method as that of Example 1 except that a polypropylene (stiffener: talc of 20%) resin layer having a thickness of 1 mm was provided on the surface of the glass layer with the etched lines are formed according to Preparation Example 1-3.

Comparative Example 4

A heterogeneous material joined body was manufactured by attaching the glass according to Reference Example 2 and a polypropylene (stiffener: talc of 20%) resin layer having a thickness of 1 mm by using an adhesive agent (3M Company).

Comparative Example 5

A heterogeneous material joined body was manufactured by the same method as that of Comparative Example 4 except that the glass according to Comparative Example 3 was used.

Information about the heterogeneous material joined bodies according to Examples 1 to 7 and Comparative Examples 1 to 5 is summarized as Table 3 below.

TABLE 3

| Classification | Glass layer | Output (W) | Speed (mm/s) | Number of times | Irradiation gap (mm) |
|---|---|---|---|---|---|
| Example 1 | Preparation Example 2-4 | 50 | 100 | 3 | 1.0 |
| Example 2 | Preparation Example 2-5 | 50 | 100 | 3 | 1.0 |
| Example 3 | Preparation Example 2-6 | 50 | 100 | 3 | 1.0 |
| Example 4 | Preparation Example 2-7 | 50 | 100 | 3 | 1.0 |
| Example 5 | Preparation Example 3-4 | 50 | 100 | 3 | 1.0 |
| Example 6 | Preparation Example 3-5 | 50 | 100 | 3 | 1.0 |
| Example 7 | Preparation Example 3-6 | 50 | 100 | 3 | 1.0 |
| Comparative Example 1 | Preparation Example 1-1 | 50 | 100 | 3 | 1.0 |
| Comparative Example 2 | Preparation Example 1-2 | 50 | 100 | 3 | 1.0 |
| Comparative Example 3 | Preparation Example 1-3 | 50 | 100 | 3 | 1.0 |
| Comparative Example 4 | Reference Example 2 | Adhesive agent | | | |
| Comparative Example 5 | Preparation Example 3 | Adhesive agent | | | |

Experimental Example 1—Measurement of Light Transmissivity of Glass Layer

Light transmissivity of Reference Examples 2 and 3 at a wavelength of 1,064 nm was measured by using equipment Solid spec-3700 made by the SHIMADZU Company.

Further, light transmissivity of Preparation Examples 2-1 to 2-5, 2-7, and 3-1 to 3-6 at a wavelength of 1,064 nm was measured by using equipment Solid spec-3700 made by the SHIMADZU Company.

Further, relative light transmissivity of Preparation Examples 2-1 to 2-3 at a wavelength of 1,064 nm to light transmissivity of Reference Example 2 at a wavelength of 1,064 nm, and relative light transmissivity of Preparation Examples 3-1 to 3-3 to light transmissivity of the glass layer according to Reference Example 3 at a wavelength of 1,064 nm are represented in FIG. 3.

Further, relative light transmissivity of Preparation Examples 2-4, 2-5, and 2-7 at a wavelength of 1,064 nm to light transmissivity of Reference Example 2 at a wavelength of 1,064 nm, and relative light transmissivity of Preparation Examples 3-4 to 3-6 at a wavelength of 1,064 nm to light transmissivity of the glass layer according to Reference Example 3 at a wavelength of 1,064 nm are represented in FIG. 4.

According to FIGS. 3 and 4, it can be seen that when the irradiation condition of the first laser is included in the exemplary embodiment of the present invention, light transmissivity of the glass layer at a wavelength of 1,064 nm after the irradiation of the first laser to light transmissivity of the glass layer, to which the first laser is not irradiated, at a wavelength of 1,064 nm is 40% or more and 98% or less.

In the foregoing range, when the second laser is later irradiated, the second laser may sufficiently penetrate the glass layer, and thus the second laser penetrates the glass layer and is irradiated to the resin layer to induce partial melting of the resin layer, thereby being expected that the resin layer and the glass layer may be smoothly joined.

Experimental Example 2—Photographed Surface and Lateral Cross-Section of Glass Layer Images of a surface and a lateral cross-section of each of Preparation Examples 2-4, 2-5, 2-7, and 3-4 to 3-6 photographed by using a scanning electron microscope (TM-1000, HITACHI Company) are represented in FIG. 5.

Referring to the photographing result represented in FIG. 5, it can be seen that even though the irradiation interval of the first laser is increased, the surfaces and the internal portions of the glass layers according to Reference Examples 2 and 3 are little damaged, and thus, when a heterogeneous material joined body is manufactured by using the Preparation Example, it may be expected that it is possible to obtain a heterogeneous material joined body having a smooth joining surface.

Experimental Example 3—Photographed Lateral Cross-Section of Heterogeneous Material Joined Body Lateral cross-sections of the heterogeneous material joined bodies according to Example 2 and 6 and Comparative Examples 1 to 4 were photographed by using the scanning electron microscope.

A photographing result of the lateral cross-sections of the heterogeneous material joined bodies according to Comparative Examples 1 to 3 is represented in FIG. 6.

According to FIG. 6, it can be seen that regardless of an increase in the irradiation interval of the first laser, a crack is generated on the surface of the glass layer according to the irradiation of the first laser, and it can be checked that a defect is generated in the heterogeneous material joined bodies according to the crack.

That is, it can be seen that like Comparative Examples 1 to 3, when the general soda lime glass is used, not the glass layer according to the exemplary embodiment of the present invention, a crack is generated in the glass layer when the first laser is irradiated according to the exemplary embodiment of the present invention, and the glass layer is not smoothly joined to the resin layer.

A photographing result of the lateral cross-sections of the heterogeneous material joined bodies according to Examples 2 and 6 is represented in FIG. 7.

Referring to FIG. 7, it can be seen that a crack is rarely generated on the surface of the glass layer unlike the evaluation result of FIG. 6, and it can be seen that the resin layer appropriately permeates the etched lines formed on the surface of the glass layer, so that the resin layer and the glass layer are smoothly joined.

Collectively, it can be seen that in the case of the present invention, in which the kind of glass layer is particularly specified to borosilicate glass or tempered glass as described above, the flat joined portion is obtained compared to the Comparative Example using the soda lime glass.

Further, it can be expected that the heterogeneous material joined bodies according to the Examples have high joining force.

Experimental Example 4—Measurement of Joining Force of Heterogeneous Material Joined Body Joining strength of the heterogeneous material joined bodies according to Examples 1 to 6 and Comparative Examples 4 and 5, in which an area of the joined portion is 5 mm×5 mm, was measured by using a tensile tester (AGS-X, SHIMADZU Company).

Digital camera images of a measurement specimen and the tensile tester used in the tensile test are represented in FIG. 8.

Particularly, digital camera images (a) and (b) of FIG. 8 show the tensile tester and an enlarged view thereof, and digital camera image (c) shows a specimen used in the test.

Referring to image (c) of FIG. 8, it can be seen that both distal ends of the heterogeneous material joined body are separately fixed, and referring to image (b) of FIG. 8, it can be seen that both distal ends of the heterogeneous material joined body are fixed to the tensile tester and are used in the tensile test.

The heterogeneous material joined bodies according to Examples 1 to 6 and Comparative Examples 4 and 5 are stretched at a speed of 10 mm/min by using the tensile tester, and a maximum tensile load at this time is expressed as joining strength, and the joining strength is represented in FIGS. 9 and 10.

Further, a digital camera image of a specimen for measuring joining strength of the heterogeneous material joined bodies according to Comparative Examples 1 to 3 is represented in FIG. 11.

It can be seen that the joining strength of Examples 1 and 2 is higher than that of Comparative Example 4, and the joining strength of Examples 5 and 6 is higher than that of Comparative Example 5.

According to FIGS. 9 and 10, in Comparative Example 4, the resin layer is joined by using a separate bonding agent without forming the etched lines on the glass layer through the irradiation of the first laser, and even though the joining strength of Comparative Example 4 is higher than that of Examples 3 and 4, there is a problem in that a separate process of hardening the bonding agent is further required. Further, it can be seen that the joining strength between the resin layer and the glass layer in Examples 3 and 4 is sufficiently implemented.

Further, similar to Comparative Example 4, in Comparative Example 5, the resin layer is joined by using a separate bonding agent without forming the etched lines on the glass layer through the irradiation of the first laser, and even though the joining strength of Comparative Example 5 is higher than that of Example 7, there is a problem in that a separate process of hardening the bonding agent is further required. Similarly, it can be seen that the joining strength between the resin layer and the glass layer in Example 7 is sufficiently implemented.

For reference, joining strength of the heterogeneous material joined bodies according to Comparative Examples 1 to 3 were measured by the same method as the foregoing method, but as illustrated in FIG. 11, in the case of the heterogeneous material joined bodies according to Comparative Examples 1 to 3, it can be seen that the glass layer itself, not the joined portion of the glass layer and the resin layer, is fractured. Particularly, both distal ends of the fractured glass layer are indicated with arrows of FIG. 11.

Collectively, it can be seen that in order to smoothly join the glass layer and the resin layer without damage to the glass layer and the resin layer through a relatively simple process, it is necessary to select the kind of glass layer according to the exemplary embodiment of the present invention, and to join the glass layer and the resin layer through the irradiation of the first and second laser under the irradiation condition according to the exemplary embodiment of the present invention.

The invention claimed is:

1. A method for manufacturing a heterogeneous material-containing joined body, wherein the method comprises:
   irradiating a surface of a glass layer with a first laser having a wavelength of 200 to 400 nm to form two or more etched lines on the surface of the glass layer, wherein a pitch of the two or more etched lines is 50 μm or more and 1,200 μm or less;
   providing a resin layer on the surface of the glass layer having the two or more etched lines; and
   irradiating the surface of the glass layer with the resin layer with a second laser to fill the etched lines and the surface of the glass layer with the resin layer and join the resin layer and the glass layer,
   wherein light transmissivity, at a wavelength of 1,064 nm, of the glass layer having the two or more etched lines is 40% or more and 98% or less, and
   wherein the glass layer having the two or more etched lines is irradiated with the second laser in a direction from the glass layer to the resin layer with focus on the surface of the glass layer which is in contact with the resin layer.

2. The method of claim 1, wherein the glass layer includes at least one of borosilicate glass, lead-alkali glass, aluminosilicate glass, fused silica glass, germanium oxide glass, germanium selenide glass, heat strengthened glass, and ion strengthened glass.

3. The method of claim 1, wherein a thickness of the glass layer is 1.5 mm or more and 10 mm or less.

4. The method of claim 1, wherein a depth of each of the two or more etched lines from the surface of the glass layer is 10 μm or more and 300 μm or less.

5. The method of claim 1, wherein the first laser is a pico second pulse laser.

6. The method of claim 1, wherein a number of times of repeated irradiation of the first laser to one or more of the one or more etched lines is 1 time or more and 50 times or less.

7. The method of claim 1, wherein an output of the first laser is 10 W or more and 50 W or less.

8. The method of claim 1, wherein an irradiation speed of the first laser is 50 mm/s or more and 500 mm/s or less.

9. The method of claim 1, wherein the second laser is a fiber pulse laser.

10. The method of claim 1, wherein an output of the second laser is 5 W or more and 100 W or less.

11. The method of claim 1, wherein an irradiation speed of the second laser is 20 mm/s or more and 500 mm/s or less.

12. The method of claim 1, wherein the glass layer is irradiated with the second laser 1 time or more and 40 times or less.

13. The method of claim 1, wherein an irradiation interval of the second laser on the surface of the glass layer is 100 μm or more and 2,000 μm or less.

14. The method of claim 1, wherein the two or more etched lines cross to form a mesh pattern.

15. The method of claim 1, further comprising, after the two or more etched lines are formed on the surface of the glass layer, forming two or more reinforcement etched lines on the surface of the glass layer by additionally irradiating the surface of the glass layer with the first laser, wherein a pitch of the two or more reinforcement etched lines is 10 μm or more and 100 μm or less.

* * * * *